W. R. Landfear,

Pegging Jack.

No. 2,331. Reissued Aug. 7, 1866.

Witnesses:

D. P. Hale Jr

Frederick Curtis

Inventor:

William R. Landfear by his attorney

R. H. Eddy

N. PETERS, PHOTO-LITHOGRAPHER, WASHINGTON, D. C.

UNITED STATES PATENT OFFICE.

D. WHITTEMORE, OF NORTH BRIDGEWATER, MASSACHUSETTS, ASSIGNEE OF WILLIAM R. LANDFEAR.

IMPROVED PEGGING-JACK.

Specification forming part of Letters Patent No. 51,262, dated November 28, 1865; Reissue No. 2,331, dated August 7, 1866.

*To all whom it may concern:*

Whereas WILLIAM R. LANDFEAR, now or late of Hartford, in the State of Connecticut, did invent a new and useful invention having reference to Pegging-Jacks, and did apply for Letters Patent of the United States thereon; and whereas such Letters Patent, No. 51,652, have been granted to the undersigned as sole assignee of all the right, title, and interest of the said LANDFEAR in and to the invention aforesaid; and whereas I have applied for a reissue of such patent to correct an insufficient specification or claim; now, therefore, I do hereby declare the said invention to be described in the following specification and represented in the accompanying drawings, of which—

Figure 3:
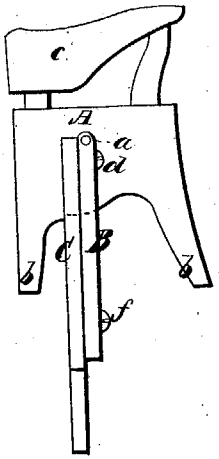
Figure 2:
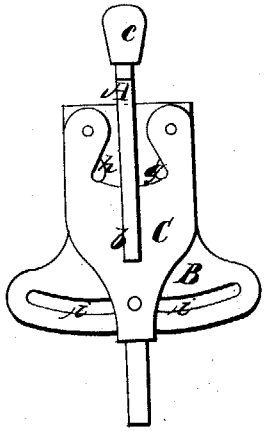
Figure 1:
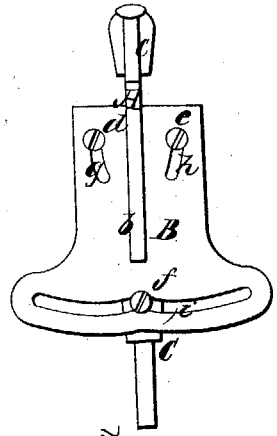

Figure 1 denotes a front, Fig. 2 a rear, and Fig. 3 a side, elevation of a pegging-jack provided with the said invention.

In the said drawings, A denotes a vibratory last-holder so applied to a plate, B, and arranged at right angles therewith as to be capable of turning on a center-pin, *a*, going through the upper part of the said plate. The said last-holder has two arms, *b b*, projecting down from it in manner, as represented in Figs. 1 and 3, and it should also be provided with proper means of supporting a last, *c*.

The plate B is applied to one side of a rotary standard, C, by means of three screws, *d*, *e*, and *f*, which go through curved slots *g*, *h*, and *i*, made through the said plate, and arranged in manner as shown in Fig. 3, the two screws *d* and *e* being at the upper part of the plate, while the third screw is at its lower part, as represented. Each screw is screwed into the standard.

Each of the upper slots has a curve whose center is in the axis of the screw which goes through the other slot. The lower slot has a curve which is struck from two centers which are at the axis of the two screws *d e*.

From the above it will be seen that when the shoe-last is horizontal transversely the plate B will be supported directly on the two screws *d e*, and so that a blow struck vertically upon the last will not tip the last or its holder and plate B to one side, as it would be likely to do when the plate B is supported on but one center-pin.

The two centers *d e*, arranged on opposite sides of the last-holder, while presenting the advantage above stated over the single center as usually employed, admit the plate B to be turned laterally on either of them, so as to bring the bottom of the sole of the last into suitable positions for the pegs to be inserted in a shoe when on the last.

By laying hold of the arms *b b* the workman, while a shoe on the last supported by the jack may be in the act of being pegged by a pegging-machine arranged over the last, can easily control the last-holder and move it as circumstances may require to bring it from time to time into its proper relations with the awl and peg-driver of the machine.

I claim as the invention of the said LANDFEAR the following, viz:

1. A pegging-jack as made with its last-supporter sustained by and so as to be capable of being moved or turned laterally on either of two separate centers, *d e*, substantially as and for the purpose described.

2. A pegging-jack as made with its last-supporter sustained by and so as to be capable of being moved or turned laterally on either of two separate centers, *d e*, and also of being tipped or turned longitudinally on a third center, *a*, the whole being substantially as described.

3. The last-supporter A as made with the two arms *b b*, substantially as represented.

4. The arrangement of the pins or screws *d e f* and the slots *g h i*, with plates B C, arranged and combined with the last-supporter A, substantially as specified.

D. WHITTEMORE.

Witnesses:
R. H. EDDY,
F. P. HALE, JR.